(12) United States Patent
Hutchin (10) Patent No.: US 8,605,761 B2
(45) Date of Patent: Dec. 10, 2013

(54) MULTI-BEAM LASER CONTROL SYSTEM AND METHOD

(75) Inventor: Richard A. Hutchin, Calabasas, CA (US)

(73) Assignee: Optical Physics Company

( * ) Notice: Subject to any disclaimer, the term of this patent is extended or adjusted under 35 U.S.C. 154(b) by 48 days.

(21) Appl. No.: 12/689,021

(22) Filed: Jan. 18, 2010

(65) Prior Publication Data

US 2011/0176565 A1 Jul. 21, 2011

(51) Int. Cl.
*H01S 3/13* (2006.01)
(52) U.S. Cl.
USPC .................................................. 372/29.023
(58) Field of Classification Search
None
See application file for complete search history.

(56) References Cited

U.S. PATENT DOCUMENTS

| 3,731,103 | A | * | 5/1973 | O'Meara | 398/140 |
| 4,102,572 | A | * | 7/1978 | O'Meara | 250/201.9 |
| 5,955,992 | A | * | 9/1999 | Shattil | 342/375 |
| 6,597,836 | B2 | * | 7/2003 | Johnson et al. | 385/33 |
| 7,058,277 | B1 | * | 6/2006 | Harkrider et al. | 385/147 |
| 7,088,743 | B2 | * | 8/2006 | Rice et al. | 372/27 |

* cited by examiner

*Primary Examiner* — Armando Rodriguez
*Assistant Examiner* — Sean Hagan
(74) *Attorney, Agent, or Firm* — The Belles Group, P.C.

(57) ABSTRACT

A multi-beam laser beam control system includes a laser transmitter configured to emit light in a plurality of beamlets. A sensor is configured to receive light from the beamlets. A processor is communicably coupled to the sensor and configured to compute a relative phase of a wavefront of at least one beamlet based on output from the sensor. A controller is communicably coupled to the processor and to the laser transmitter. The controller is configured to adjust a phase of at least one of the beamlets.

40 Claims, 6 Drawing Sheets

MULTI-BEAM LASER CONTROL SYSTEM AND METHOD

BACKGROUND OF THE INVENTION

1. Field of the Invention

The field of the present invention relates to multi-beam laser control systems which are capable of compensating for wavefront distortions in a laser beam traveling from its source to a remote target through an atmospheric path, imaging the target in real time, and selecting and maintaining a suitable hitspot location on the target.

2. Background

Lasers are often operated in applications that require tracking and phase correction to form high quality focused spots at targets located substantial distances from the laser source. Due to boundary layer disturbances and other atmospheric turbulence, a laser beam control system is typically employed to maintain high beam quality at the target. The beam control system provides the ability to both sense the phase distortions and to correct them at the laser source. Because the boundary layer and atmospheric distortions are often dynamic, the beam control system is usually operated in closed loop at sufficient bandwidth to keep up with the dynamics of the atmosphere.

One utility for such a system is a set of military applications where it is desirable to focus the energy of a high energy laser (HEL) to achieve maximum intensity at a specified location of a remote target. This laser energy may be generated as a single beam or as a set of multiple coherent beamlets which are tracked and phased to produce a high quality hit spot on the target.

In the case of a single beam laser source, the atmospheric turbulence effect on the HEL beam may be determined by transmitting a second lower power laser beam (or beacon) to the target and then measuring the wavefront phase of the beacon beam return that scatters from the target back into the HEL transmitting aperture. The inverse of the measured wavefront phase pattern is applied to the outgoing HEL beam which then provides the necessary phase correction. This process is well known in the art. An alternate high energy laser beam control architecture suitable for a laser-target engagement scenario is disclosed in U.S. patent application Ser. No. 12/412,547, filed Mar. 27, 2009, the disclosure of which is incorporated herein by reference in its entirety.

In the case of an HEL beam composed of multiple coherent beamlets, one option is to phase the beamlets together at the source and then transmit them as a single coherent beam to the target. However, this approach may require the use of a large beam director on a turret which is heavy and bulky. In addition, for HEL systems on air vehicles, the turret beam director can be disruptive to the aerodynamic performance of the vehicle. For these reasons, it is desirable to implement a multi-beamlet HEL system with many separate small beamlet apertures to make a much lighter, smaller and less intrusive HEL system. However, there is no known technique in the art to point and phase the beamlets in order to make a high quality focused spot on the target at a stable location.

SUMMARY OF THE INVENTION

The present invention is directed toward a system and method for controlling a multi-beam laser. In the system, a laser transmitter is configured to emit light in a plurality of beamlets, and a sensor is configured to receive light from the beamlets, either directly or indirectly. A processor communicates with the sensor and is configured to compute a relative phase of a wavefront of at least one beamlet based on output from the sensor. A controller communicates with the processor and the laser transmitter and is configured to adjust a phase of at least one of the beamlets.

Many optional features, which may be implemented alone or in combination, are available within this system to introduce different functionality. With respect to the transmitter, it may advantageously include a master oscillator power amplifier or a fiber laser tree. It may also include a steering mechanism configured to steer at least one of the emitted beamlets. The laser transmitter may be configured to emit the beamlets at one or more wavelengths, at one or more polarizations, or at any combination of one or more wavelengths and one or more polarizations. The laser transmitter may also advantageously be configured to increment the phase of at least one of the beamlets by at least two offsets from an initial value and then to restore the phase to the initial value.

With respect to the sensor, it may include a plurality of sensor elements, each associated with its own receiving aperture. As a further option, one or more of the receiving apertures may include a steering mechanism configured to steer light incident upon the receiving aperture. The sensor may also be configured to measure intensity and/or phase differences at one or more wavelengths and/or one or more polarizations. As another advantageous option, light from the beamlets may be received by the sensor after being scattered off a target.

The processor may be configured to compute the phase value of at least one of the emitted beamlets to maximize and/or minimize one or more features of the beamlets. The processor may also be configured to compute a three dimensional turbulence profile of space between the transmitter and the sensor.

In the method, light is emitted in a plurality of beamlets from a laser transmitter, and light from the beamlets is detected at a sensor, with the phase and direction of at least one of the emitted beamlets being adjusted based upon the detected light. Several optional features may also be incorporated into the method, either alone or in combination. As one option, the beamlets may be directed toward a target. As another option, the phase of beamlets may be adjusted. This may include initially adjusting the phase of at least one of the beamlets prior to detecting light from the beamlets. It may also include adjusting the phase of a plurality of the beamlets, one beamlet at a time. When adjusting the phase of a beamlet, the phase may be incremented one or more times before being returned to an initial phase value. The method may further include calculating phase distortions induced by the transmission medium between the transmitter and the sensor when the phase of one or more beamlet is adjusted. These phase distortions may be used to compute a phase value for one or more of the beamlets. The phase distortions may also be used to aid in steering the point of incidence of the beamlets on the target by calculating an appropriate phase correction solution from the phase distortions.

Accordingly, an improved system and method for controlling a multi-beam laser is disclosed. Advantages of the improvements will appear from the drawings and the description of the embodiments.

BRIEF DESCRIPTION OF THE DRAWINGS

In the drawings, wherein like reference numerals refer to similar components.

DETAILED DESCRIPTION OF THE PREFERRED EMBODIMENTS

Figure 1:
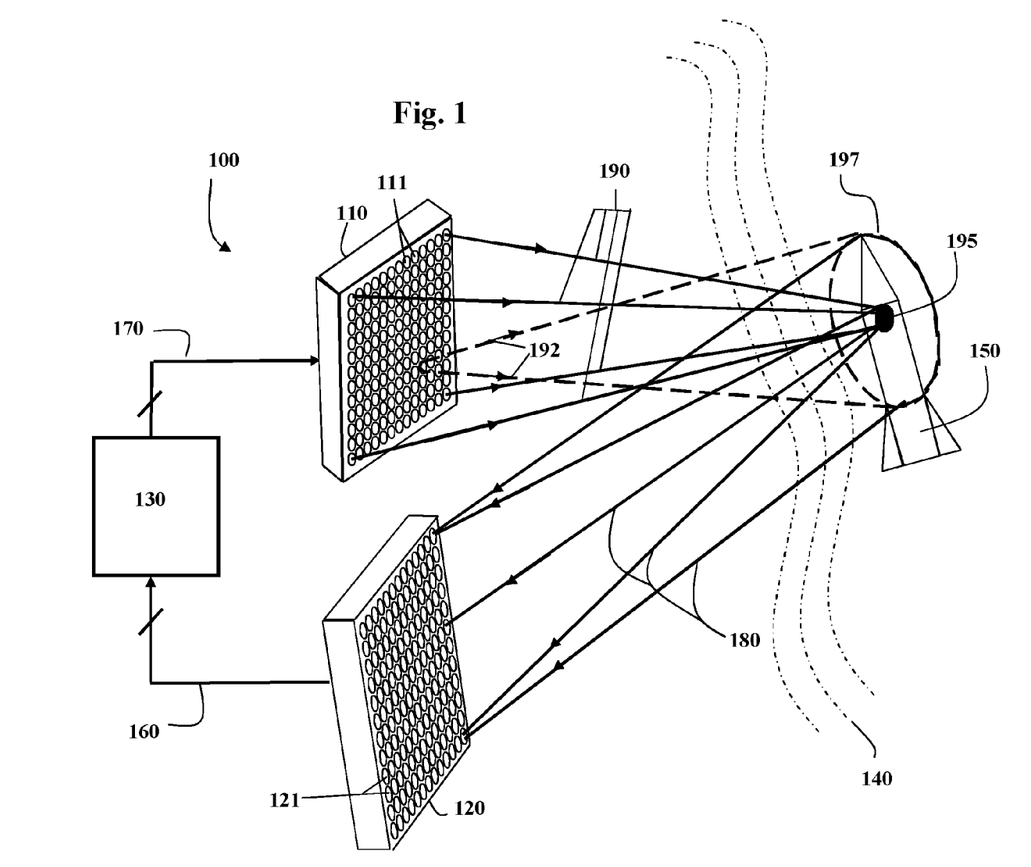
FIG. 1 schematically illustrates a multi-beam laser control system.

Turning in detail to the drawings, FIG. 1 illustrates a multi-beam control system 100 which includes a multi-beam transmitter array 110 and a multi-aperture sensor array 120 communicably coupled to a processor 130. The multi-beam transmitter array 110 includes a plurality of transmit apertures 111, through which a plurality of beamlets 190 are emitted. The transmitter array 110 may emit beamlets at one, two, or more predetermined wavelengths. Furthermore, the beamlets may be of various polarization states. The beamlets emitted through the plurality of transmit apertures 111 may also be switched between different wavelengths and polarization states during operation. As shown, the beamlets 190 are directed toward and incident upon a target, and return light 180 scattered from the target is received by the receive apertures 121 of the multi-aperture sensor array 120.

At least one of the transmit apertures 111 includes optical elements configured to adjust the phase and direction of the beamlet 192 emitted from that aperture. At least one of the receive apertures 121 includes optical elements configured to measure certain characteristics of the incident light. These characteristics may include overall light intensity, intensity of light in a particular spectral band, intensity of light of a particular polarization state, and phase differences between light of different polarizations or polarization states. In addition, at least one of the receive apertures 121 is configured to steer the incoming return light 180 toward a detector within the aperture. Using the output of the sensor array 120, the processor 130 is configured to calculate the phase values 170 of beamlets 190 emitted from the transmitter array 110. Details of the transmit apertures 111, receive apertures 121, and the operation of the processor 130 are discussed in greater detail below.

Several optical modifications may be incorporated into the system 100 without changing the basic principles of operation. For example, the transmit apertures 111 may be merged into a single aperture. As another example, both the transmit apertures 111 and the receive apertures 121 may be arranged on a non-planar or curved surface, instead of on a planar surface as shown. The apertures may also cover areas which are round, square, elliptical or almost any convenient geometrical configuration. They may even be dispersed over multiple disjoint regions. This adaptability allows for convenient flexibility in mounting the transmitter and sensor arrays. In addition, much of the performance is maintained even if some of the transmitter beamlets or sensor apertures malfunction. Such robust operation can be very desirable depending upon the application.

To minimize the amount of aerosol scatter received by the sensor array 120, the sensor array 120 and the transmitter array 110 can be positioned at some distance from one another. Aerosol scatter tends to be incoherent with respect to the target scatter, so the separation would largely improve the modulation level of the observed signal during operation, which in turn improves accuracy, providing better phasing control information for the transmitter beamlets. Such separation is thus not required but can be a performance enhancing feature.

The processor 130, which may be any type of general purpose programmable processor, receives and processes the sensor array outputs 160 to calculate phase modulation values 170 for certain beamlets of the transmitter array 110. The processor 130 may then adjust the phase modulation values 170 of one or more of the beamlets emitted by the transmitter array 110. These phase modulation value adjustments may be determined to compensate for the turbulence 140 between the multi-beam transmitter array 110 and the target 150, as the turbulence 140 distorts the phase of each beamlet exiting the transmitter array 110. The phase modulation value adjustments may also be determined such that a tightly focused beam 190 can be directed to a particular hit spot 195 on the target 150. This manner in which these adjustments are made is discussed in greater detail below.

Figure 2:
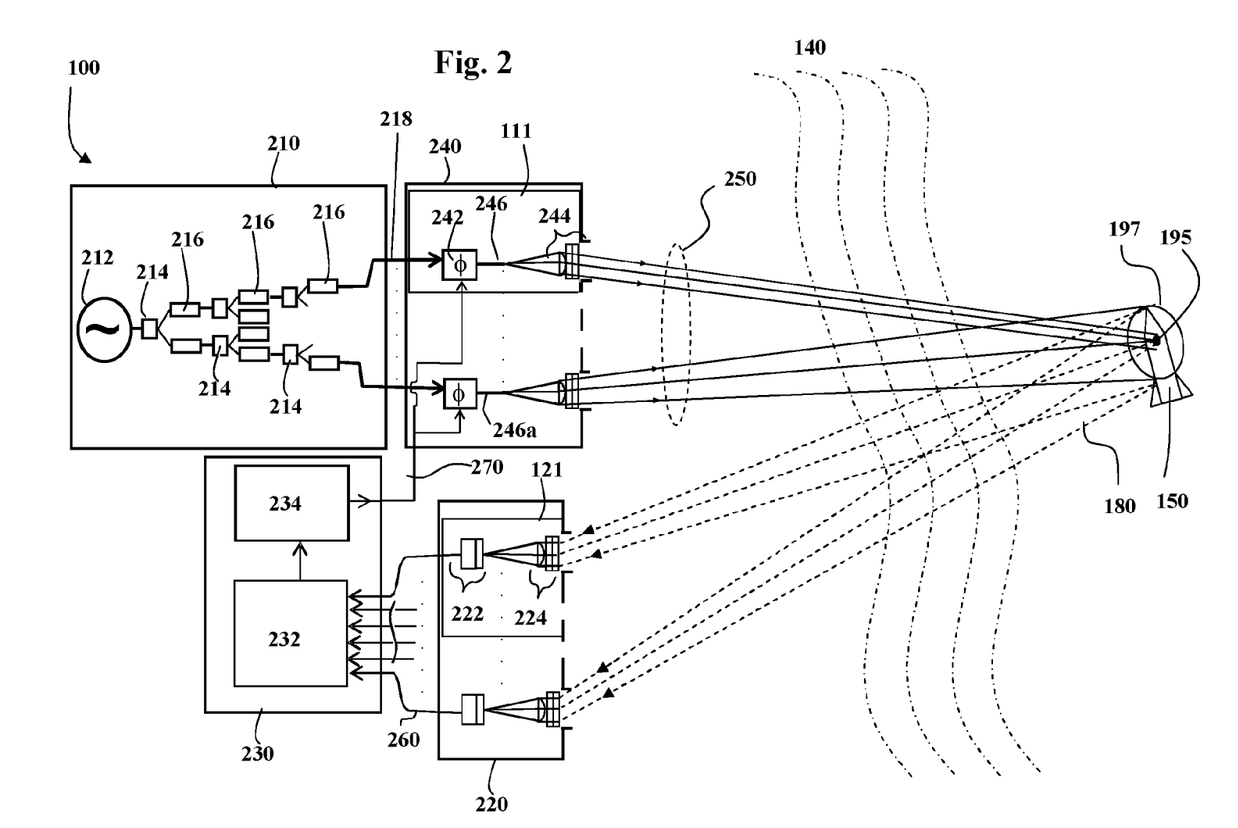
FIG. 2 schematically illustrates a more detailed view of the multi-beam laser control system of FIG. 1.

FIG. 2 illustrates the multi beam laser control system 100 in greater detail. A fiber laser tree 210 produces a plurality of beamlets 218, which are directed into the phasing and steering array 240. The fiber laser tree 210 is constructed by splitting the optical signal from a master oscillator 212 one or more times using splitters 214 and amplifying the split signals using a plurality of amplifiers 216. This arrangement is often referred to as master oscillator power amplifier (MOPA) configuration. Many alternate arrangements for construction of the fiber laser tree 210 are possible. Within each transmit aperture 111 of the phasing and steering array 240, the amplified beamlets 218 are first phase modulated using phasors 242 to produce phase modulated beamlets 246, which are then steered using optical elements 244 so that the beamlets are directed at the target hit spot 195. The plurality of steered beamlets produce a composite bundle of beamlets 250 generally having a greater total power level than that originally provided by the master oscillator 212. The steering mechanism may be local to the phasing and steering array 240 or optionally be controlled, at least in part, by the computer device 230.

The return light 180 scattered from the target is incident upon the multi-aperture sensor array 220. Each receive aperture 121 of the sensor array 220 includes a first set of optical elements 224 configured to steer the incoming light towards the detectors 222, which themselves are configured to measure characteristics of the incident light.

The computer device 230 receives output from the multi-aperture sensor array 220, and that output is processed through the processor 232. The processor 232 is communicably coupled with the phase controller 234, which is in turn communicably coupled to the phasing and steering array 240, thereby enabling the computer device 230 to control the phasing and steering array 240 based upon the output of the multi-aperture sensor array 220.

Several optical modifications may be incorporated into the system 200 without changing the basic principles of operation. As one example, the phasors 242 may be positioned before the last stage of the amplifiers 216.

Figure 3:
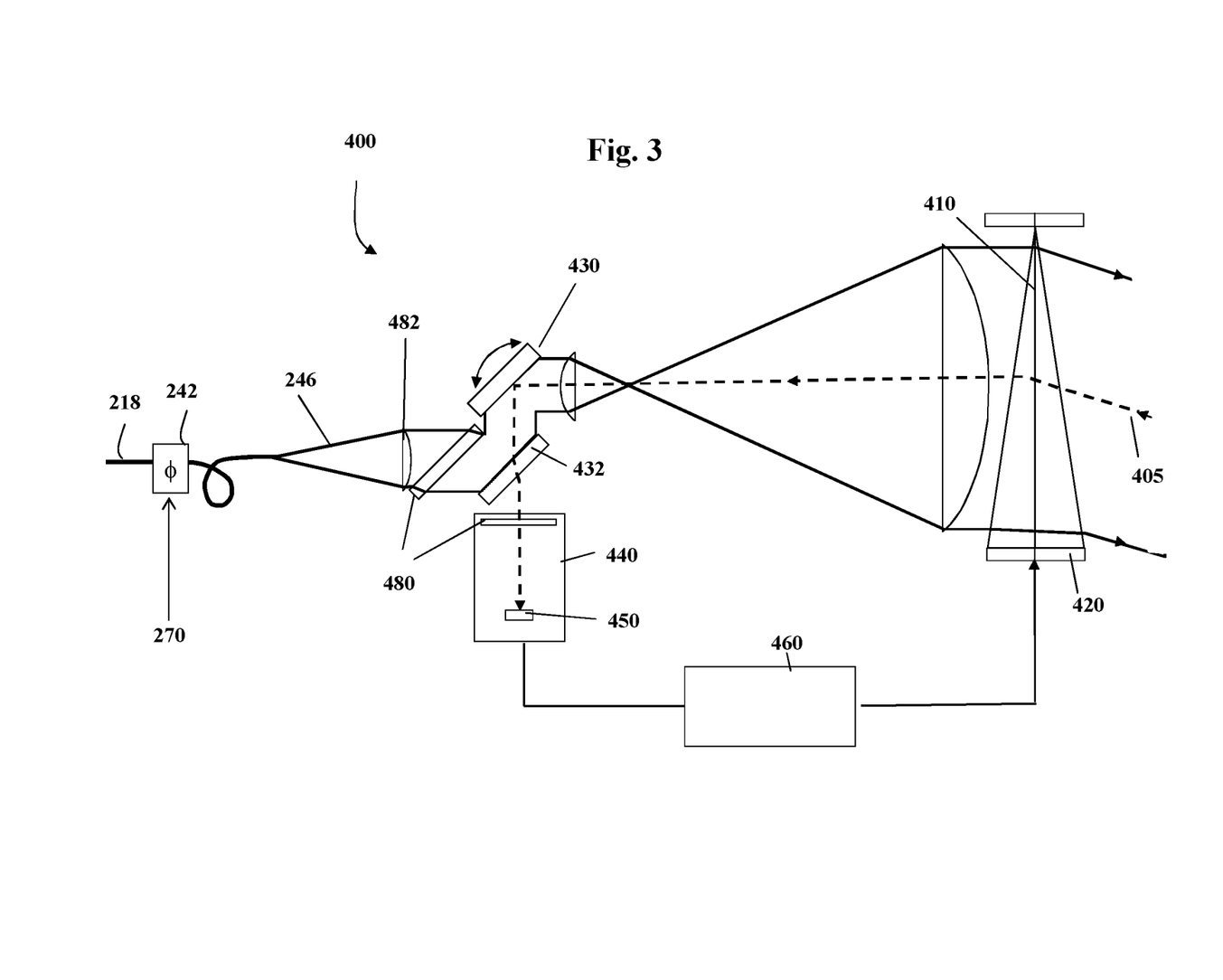
FIG. 3 schematically illustrates a single transmit aperture of the multi-beam laser control system of FIG. 1.

FIG. 3 illustrates a single transmitter aperture 400 for the multi-beam transmitter array 110. The phase modulated beamlet 246 is directed through a series of lenses 482 and reflected off a polarizing beam splitter (PBS) 432. A fast steering mirror (FSM) 430 is included for fine steering control, and a Risley prism pair 410, which is oriented using two rotation stages 420, is included for coarse steering control of the emitted beamlet. Steering is achieved with the aid of laser light 405 incident upon the aperture 400, this laser light 405 being light return from the target. The Risley prism pair 420 directs the incident laser light 405 along the optical axis of the transmit aperture 400 where it is steered by the FSM 430 towards the PBS 432. The PBS 432 directs the incident laser light 405 to a tracker 440, which includes a position detector sensor 450. The output of the position detector sensor 450 provides a measurement of where the centroid of the incident laser light 405 is positioned with respect to the optical axis of the transmit aperture 400. The position detector sensor 450 output is sent to a controller 460 which adjusts the rotation stages 420 so that the centroid of the incident laser light 405 coincides with the optical axis of the transmit aperture 400. Thus, the Risley prism pair 410, rotation stages 420, the FSM 430, the tracker 440, and the controller collectively implement the steering functions for the transmit aperture 400. Optionally, clean-up polarizers can be placed in the optical path of the phase modulated beam 246 for polarization control.

While it may be advantageous to utilize the laser light return as a reference for steering the beamlets (as disclosed in U.S. patent application Ser. No. 12/412,547), another approach for controlling pointing direction is to flood the target with a track illuminator laser, which typically operates at a wavelength different from the wavelength of the bundle of beamlets 250. In this alternative approach, the return of the track illuminator laser can be used for directing the beamlets.

Regardless of which approach is used to establish a reference for steering the beamlets, the method for controlling beamlet pointing direction is to point each beamlet toward the centroid of the incoming laser light. The pointing direction can be further corrected with a potential point-ahead offset to compensate for the speed of light delay, e.g., to accommodate target or transmitter array motion. Sometimes, the presence of a highly reflective area on the target (such as a retroreflector) may require that the beamlets point with a specified offset from the centroid of the laser light return so that they will be incident on the desired aimpoint.

Figure 4:
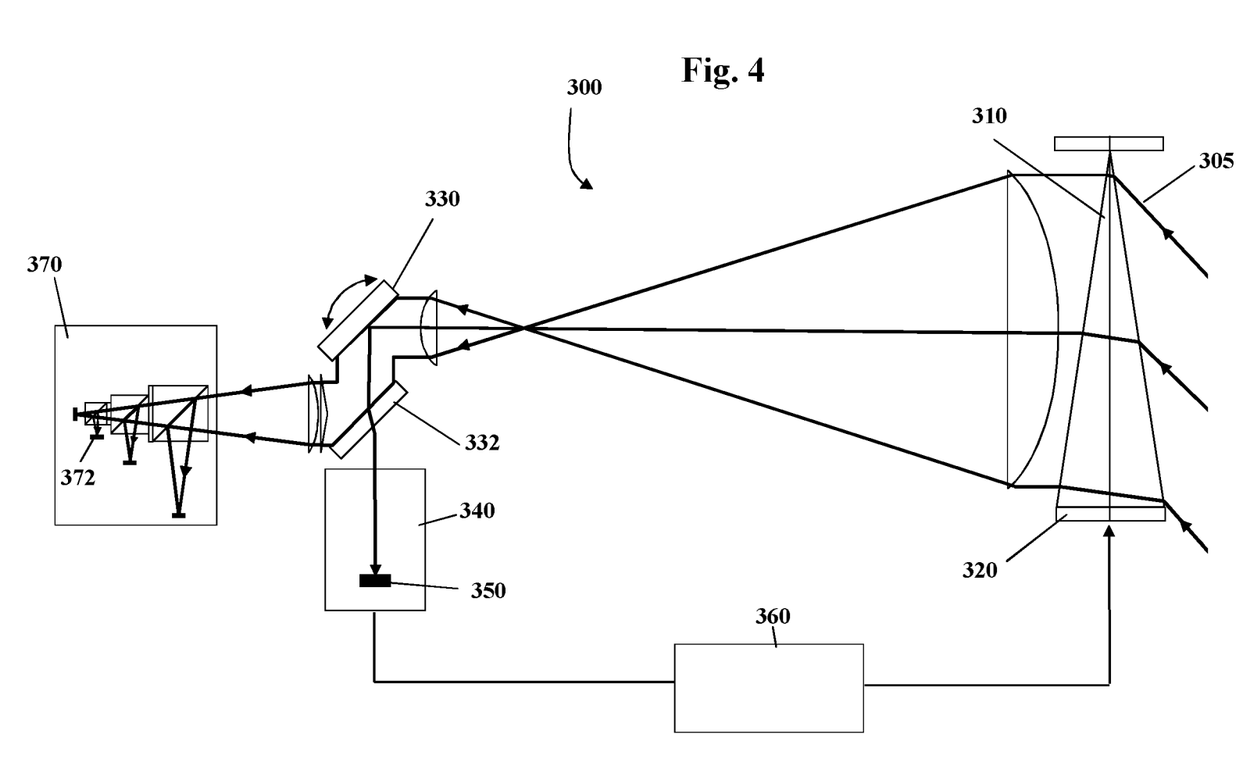
FIG. 4 schematically illustrates a single receive aperture of the multi-beam laser control system of FIG. 1.

FIG. 4 illustrates a single sensor aperture 300 for the sensor array 120. The laser light 305, which is the light return from the target, is incident upon a Risley prism pair 310, and the Risley prism pair 310 is oriented using two rotation stages 320. The Risley prism pair 310 directs the laser light 305 along the optical axis of the sensor aperture where it is steered by a FSM 330 toward a beam splitter 332. The beam splitter 332 apportions the laser light 305 between a tracker 340 and a polarimeter 370. The tracker 340 includes a position detector sensor 350, the output of which provides a coarse measurement of where the centroid of the laser light 305 is situated with respect to the optical axis of the sensor aperture 300. The position detector sensor 350 output is sent to a controller 360 which adjusts the rotation stages 320 so that the centroid of the laser light 305 coincides with the optical axis of the sensor aperture 300. This provides fine control over the centroid of the laser light 305. Thus, the Risley prism pair 310, rotation stages 320, the FSM 330, the beam splitter 332, the tracker 340, and the controller 360 collectively steer the laser light 305 within the sensor aperture. The laser light 305 that is not directed towards the tracker 340 is directed towards a polarimeter 370. The polarimeter 370 measures the polarization state of the laser light 305 characterized by the four Stokes parameters (often referred to in the art as I, Q, U, and V).

Several optical modifications may be incorporated into the sensor aperture 300 and the transmitter aperture 400 without changing the basic principles of operation. As one example, the Risley prism steering mechanism may be replaced by steerable liquid crystal gratings.

As a side note, implementing a sensor for measuring the intensity of light coming into an aperture is far more practical than implementing a sensor for measuring the complex wavefront since intensity information can be gathered by individual apertures of the sensor without requiring any phasing knowledge or control between apertures. This also allows the beam control system to utilize non-planar sensor arrays that can be conformal to the skin of the platform it is mounted on. Conformal mounting is advantageous and often necessary for fast moving platforms (e.g., aircraft) since it interferes minimally with the aerodynamics of platform motion.

Figure 5:
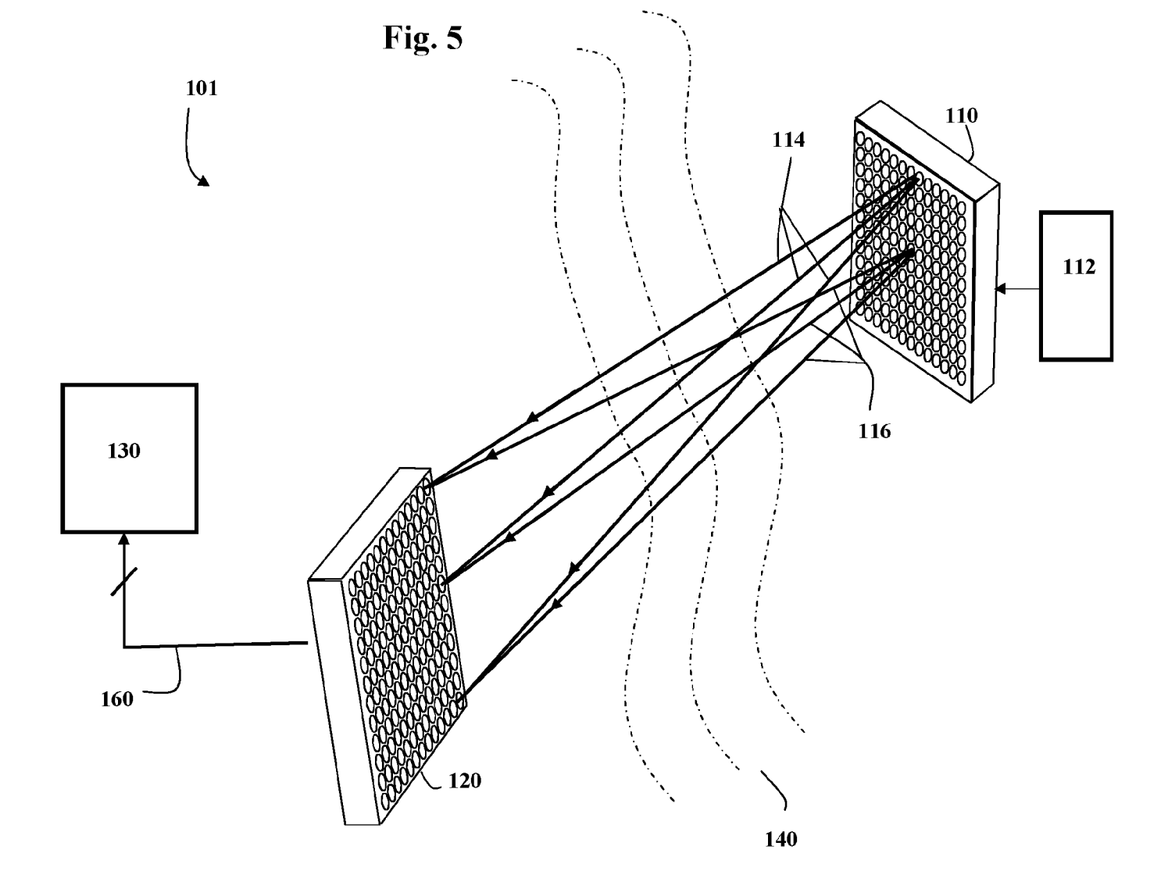
FIG. 5 schematically illustrates an alternative embodiment of a multi beam laser control system.

FIG. 5 illustrates an alternate arrangement for the control system. The resulting system 101 is configured to measure the three dimensional distribution of the turbulence phase profile in a volume of transmission medium. The multi-beam transmitter array 110 and the multi-aperture sensor array 120 are positioned at opposite ends of the profiled volume. The transmitter array 110 is coupled to a controller 112. The controller 112 is configured to turn the beamlets emitted from the transmitter array 110 on and off. The controller 112 is also configured to manipulate the phase of a reference beamlet 114 emitted from the transmitter array 110. The sensor array 120 is coupled to a processor 130 which processes the outputs 160 from the sensor array 120 to calculate the three dimensional distribution of the turbulence phase profile in the transmission medium between the transmitter array 110 and the sensor array 120.

During the turbulence profiling of the transmission medium volume, one beamlet, namely the reference beamlet 114 of the multi-beam laser transmitter array 110, is phase modulated by the controller 112. The remaining beamlets, referred to as flicker beamlets, are equipped with on/off capability so that they can be turned on or off by the controller 112. While only one flicker beamlet 116 is turned on, the phase of the reference beamlet 114 is dithered. As used herein, the term "dither" refers to the process of altering the phase value of a beamlet by adding or subtracting one or more offsets, then returning the phase value to its original nominal value. For example, the phase of a reference beamlet can be dithered by incrementing the starting phase value of the reference beamlet 114 twice by $\pi/2$ and finally by $-\pi$, thus restoring its starting phase. The multi-aperture sensor array 120 captures the resulting wavefronts at each reference beam 114 phase modulation step. The outputs 160 from the sensor array 120 are sent to the processor 130. Then, the flicker beamlet 116 is turned off. The process is repeated for each of the remaining designated flicker beamlets. The processor 130 computes the relative phases of all of the wavefronts captured at the sensor array 120 and three dimensional turbulence aberrations in the volume between the sensor array and the transmitter.

The method used for measuring the three dimensional distribution of turbulence is to measure the linear complex amplitude response between a transmitter array and the sensor array and quantify it in terms of Green's Functions. The resulting path characterization is complete enough so that the field on the target can be accurately computed for any phasing pattern on the transmit beamlets. The Green's Function data allows the data to be inverted to determine the three dimensional turbulence distribution along the path. This method is essentially the same regardless of whether the beamlets are pointed toward a target, as shown in FIG. 2, or they are pointed directly at the sensor array, as shown in FIG. 5.

In the context of FIG. 2, where the beamlets are pointed toward the target 150, phase modulation values 270 applied to beamlets 218 are computed based on a beam quality metric. This beam quality metric in turn is based on the Green's Function data that characterizes the phase disturbances caused by the atmospheric path. The beam quality metric is mathematically formulated in a manner that ties its numerical value to the intensity of the composite beamlet bundle 250 incident upon the target 150. Thus, increasing beam quality metric value corresponds generally to a higher intensity beam bundle 250 incident upon the target 150. To measure the Green's Functions, the phase values of certain beamlets are dithered. As mentioned earlier, one way to accomplish dithering of the phase value of a beamlet is to add $\pi/2$, and $\pi$ to the most recent phase value of the beamlet. The dithered beamlet 246a is still directed at the target 150 illuminating a portion of the target 197 even though it is not necessarily phase modulated for the hit spot 195.

The beamlet dithering rate is typically on the order of several MHz. Such MHz rate phase modulation may be implemented using currently available fiber phase controllers developed for laser communications.

Figure 6:
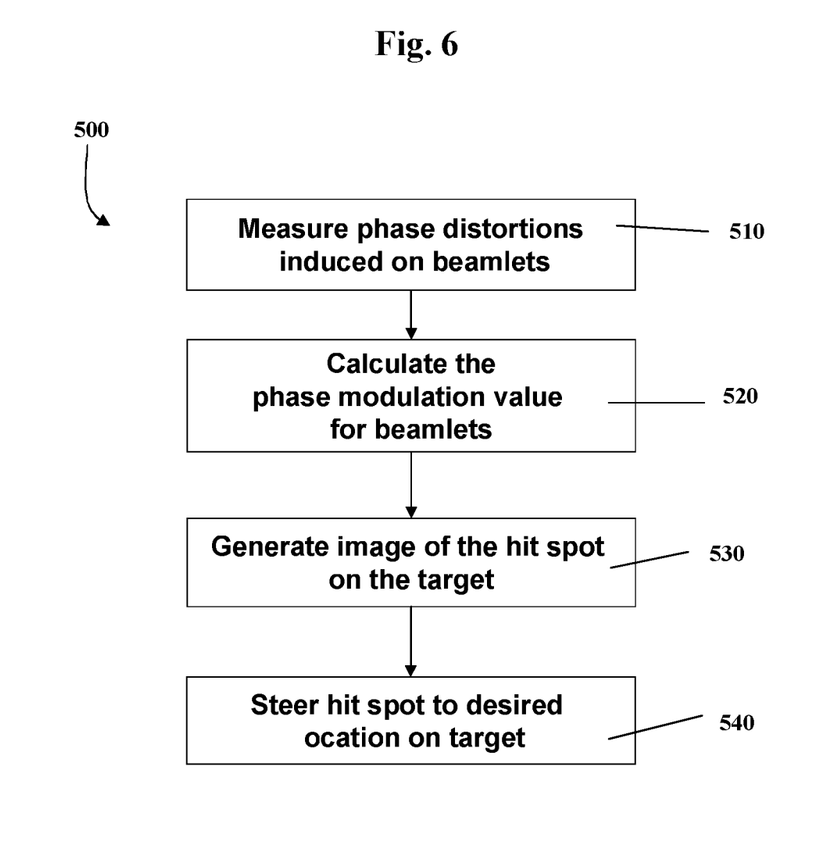
FIG. 6 is a flowchart illustrating a method of operating a multi-beam laser control system.

FIG. 6 illustrates steps for operating the multi-beam laser control system described above. As an overview, the first step 510 is measuring the phase distortions induced by the transmission medium. These phase distortions can be quantified in Green's Functions. The second step 520 is calculating the phase modulation values for the transmitter array beamlets so that a tightly focused composite beam is incident on the target. This calculation can involve the maximization of a suitable beam quality metric. The third step 530 is generating the image of the resulting hit spot on the target. Finally, the fourth step 540 is steering the hit spot to a desired location on the target.

Turning to the details of the measuring step 510, one method to calculate the beamlet phase modulation values is to start with measuring phase distortions caused by the transmission path from the transmitter array to the target. To accomplish this, the processor selects one transmitter beamlet and dithers its phase value by adding at least two offsets to the phase value before restoring the phase value. One option for realizing the phase dither is to add first $\pi/2$ and then another $\pi/2$ (resulting in total phase offset of $\pi$) to the phase modulation value of the selected beamlet. For example, if the starting phase of the beamlet is 0, the dithering process increments it first to $\pi/2$, second to $\pi$, and third restores it back to 0. The phase dithering of transmitter beamlets one at a time allows the system to measure critical information, thereby enabling phase settings for transmitter beamlets to be calculated. Further, the transmitter beamlets may be dithered in any order, from sequential to entirely random.

At the start of the operation of the system, the beamlets of the transmitter array are typically randomly phased, and their relative phase values are not known. On start up, the processor selects all or a subset of beamlets to be dithered, and each selected beamlet is dithered one at a time. While the multiple beamlets may be dithered simultaneously, the process is simplified by one at a time dithering. At each dithering step, the sensor array makes measurements of the target return in all of the receive apertures. As an example, a transmitter array has N beamlets, and every beamlet is dithered one at a time so that 3N frames of sensor array outputs are sent to the processor. The processor processes the 3N frames of outputs of the sensor array and calculates the next set of phase modulation values for all of the N beamlets. The processor then sends commands to the transmitter array to adjust the phase of each of the N beamlets in accordance with the phase modulation value calculated. The dithering process is repeated. Dithering is again followed by phase modulation as described. With each iteration of the dithering and phase modulation loop, the phase modulation values for the N beamlets converge to values which compensate for the transmission medium disturbances and form a focused beam at the target. Because the transmission medium disturbances are dynamic, the system is often operated in closed loop at sufficient bandwidth to keep up with the changing properties of the medium.

Note that of these possible 3N frames in this example, 2N are made with one of the beamlets being dithered away from its initial phase value, and the remaining N measurements are made with all beamlet phases set to their initial values. In actual operation many of these remaining N measurements, where all the beamlets are set to their initial phase modulation values, may be skipped, since they are largely redundant. In addition, the number of frames may be significantly varied, as may the number of frames in which one of the beamlets is dithered, depending upon the application and desired results for the laser control system.

Note also that the dithered beamlet is still directed at the target illuminating a portion of the target even though it is not phase modulated for contributing to a high intensity hit spot. The coherent nature of the laser beam incident upon the target causes the dithered beamlet to interfere with the undithered beamlets at the target and then back at the sensor. This interference in turn causes the measured intensities to fluctuate. The modulated intensities are detected at the sensor array synchronous to the phase dithering when adjusted for the round-trip speed of light delay to the target.

The multi-beam laser control systems can be operated closed loop at 1-5 KHz update rates. For example, if all 100 beamlets of a 10×10 transmitter array are dithered at a 3 MHz step rate towards a remote target located 15 km away, given that the speed of light is about $3\times10^8$ meters per second, about 100 microseconds will elapse for each dithered beamlet to travel from the transmitter array to the target and back to the sensor array. While the sensor array gathers and accumulates data, the Green's Functions can be simultaneously computed, so that a full set of Green's Functions is available within a few microseconds after the light from the last dithered beamlet is received at the sensor array. The processing of the Green's Functions into phasing commands for the transmitter array can also take 50-100 microseconds. This combination of transmit, receive and process steps may then take a total of about 150-200 microseconds, which is consistent with a 5 KHz update rate. However, the round trip time of light (100 microseconds for a 15 km target range) can also create additional control latencies even though the update rate is 5 KHz. These latencies may be taken into account in the design of the beam control system.

At each dithering step, the sensor array measures the polarimetric state of the return light in each sensor aperture. The polarimetric state in each sensor aperture can be quantified as the four Stokes parameters. The processor uses this polarimetric information to compute the Green's Functions per transmitter beamlet and determine the phase settings for transmitter beamlets. The phase controller then phase modulates transmitter beamlets accordingly.

Optical propagation from the transmitter beamlets to the target and back to the sensor is a linear process in complex amplitude and polarization from zero up to all intensity levels anticipated in high energy laser systems. Each transmitter beamlet by itself produces a complex field (or wavefront), referred to as its Green's Function, at the sensor array. Each polarization state has its own Green's Function, and the total field at the sensor array is simply a sum of all the beamlet Green's Functions multiplied by their complex phasors as shown in Equation Set 1. Equation Set 1 shows Green's Functions for X and Y polarization states, but they could be any two independent polarizations states that are simply linear combinations of X and Y polarizations. The Green's Functions change in overall phase depends on what is considered "zero phase" at the beamlet. The convention used herein is to define zero phase as the current control phase of a beamlet when estimating the Green's Functions. Thus, $WF_X$ and $WF_Y$ in Equation Set 1 with all $\phi_{bmlet}$ components set to zero will be the wavefronts received by the sensor array 120 when all the beamlets are at their nominal control phases.

$$\begin{pmatrix} WF_X(\phi_{bmlet}, \vec{x}_{sensor}) \\ WF_Y(\phi_{bmlet}, \vec{x}_{sensor}) \end{pmatrix} = \begin{bmatrix} \sum_{jt=1}^{N_{bmlet}} \left( e^{i \cdot \phi_{bmlet\,jt}} \cdot GF_X(jt, \vec{x}_{sensor}) \right) \\ \sum_{jt=1}^{N_{bmlet}} \left( e^{i \cdot \phi_{bmlet\,jt}} \cdot GF_Y(jt, \vec{x}_{sensor}) \right) \end{bmatrix} \quad \text{Equation Set 1}$$

where:
  WFX=Wavefront of the transmitter array composite beam in polarization X;
  $WF_Y$=Wavefront of the transmitter array composite beam in polarization Y;
  jt=index of the transmitter array beamlet;
  $N_{bmlet}$=Number of beamlets emanating from the transmitter array;
  $\phi_{bmlet}$=Vector of complex phasors for the transmitter array beamlets;
  $\phi_{bmlet\,jt}$=Complex phasor of the transmitter array beamlet (jt);
  $\vec{x}_{sensor}$=Sensor array aperture location which is a two dimensional (x,y) vector;
  $GF_X$=Green's Function for polarization X; and
  $GF_Y$=Green's Function for polarization Y.
Note that $GF_X$ and $GF_Y$ above are arrays of complex numbers—one complex number for each transmitter array beamlet (numbered jt) and for each sensor array aperture location $\vec{x}_{sensor}$. The process for estimating these arrays numerically is described later in Equation Set 2-Equation Set 5 and the corresponding text.

Analysis of the modulated signal intensities with a high speed polarimeter provides a way for measuring these Green's Functions which together characterize the round trip optical path from the beamlet transmitter array to the sensor under all phasing conditions using Equation Set 1. By defining a suitable beam quality metric, this Green's Function information can then be used to calculate the phase modulation values of the beamlets in the transmitter array so that a tightly focused beam is directed to a desired hit spot location on the target.

The processor uses polarimetric data captured by the sensor array to deduce the Green's Functions for beamlets. The four Stokes values measured by the polarimeter sensor can be linearly combined to give the intensity of polarization X ($I_X = |WF_X|^2$), the intensity of polarization Y ($I_Y = |WF_Y|^2$) and the complex conjugate product between $WF_X$ and $WF_Y$ at each sensor location $\vec{x}_{sensor}$. All three measurements have the units of signal counts in the sensor, and other linear combinations can be used if desired. These three quantities can be written in terms of the Green's Functions by using Equation Set 1 above to yield the result in Equation Set 2 below. For simplicity beamlet phase zero is defined to be the current phase setting for the beamlet which means that the phases in Equation Set 2 are the deviations from the current values.

Every term on the right side is a complex conjugate product of two Green's Functions multiplied by a unit phasor. Note that $I_X$ and $I_Y$ are both real while the conjugate product of $WF_X$ and $WF_Y$ is complex.

$$I_X(\vec{x}_{sensor}) = \left\| \sum_{jt=1}^{N_{bmlet}} \left( e^{i \cdot \phi_{bmlet\,jt}} \cdot GF_X(jt, \vec{x}_{sensor}) \right) \right\|^2 \quad \text{Equation Set 2}$$

$$I_Y(\vec{x}_{sensor}) = \left\| \sum_{jt=1}^{N_{bmlet}} \left( e^{i \cdot \phi_{bmlet\,jt}} \cdot GF_Y(jt, \vec{x}_{sensor}) \right) \right\|^2$$

$$\overline{WF_X} \cdot WF_Y(\vec{x}_{sensor}) = \sum_{jt=1}^{N_{bmlet}} \overline{\left( e^{i \cdot \phi_{bmlet\,jt}} \cdot GF_X(jt, \vec{x}_{sensor}) \right)} \cdot \sum_{jt=1}^{N_{bmlet}} \left( e^{i \cdot \phi_{bmlet\,jt}} \cdot GF_Y(jt, \vec{x}_{sensor}) \right)$$

where the bar over $WF_X$ indicates complex conjugation.

Equation Set 2 is used to solve for the $G_X$ and $G_Y$ of beamlets and sensor array apertures, one at a time. To write these equations out in their simplest form, $WF0_X$ and $WF0_Y$ are defined as the X and Y polarization wavefronts coming into the sensor array when beamlets are set to zero phase (representing the current phase modulation value) as shown in Equation Set 3.

$$WF0_X(\vec{x}_{sensor}) = \sum_{jt=1}^{N_{bmlet}} GF_X(jt, \vec{x}_{sensor}) \quad \text{Equation Set 3}$$

$$WF0_Y(\vec{x}_{sensor}) = \sum_{jt=1}^{N_{bmlet}} GF_Y(jt, \vec{x}_{sensor})$$

Using these definitions three sets of three equations are obtained for every sensor array aperture location when the phase modulation value of each beamlet is set first to its nominal value, then to $\pi/2$ and then $\pi$. Dropping the $\vec{x}_{sensor}$ argument for clarity since the solver will be applied to one sensor location at a time, then for each sensor aperture nine equations in four unknowns result, which are solved to find $GF_X$ and $GF_Y$ (the X and Y Green's Function values at that sensor location) as well as $WF0_X$ and $WF0_Y$.

$I0_X = (|WF0|)^2$ $I0_Y = (|WF1|)^2$ $WW0 = \overline{WF0} \cdot WF1$ $I1_X = [|WF0 + GF_X \cdot (i-1)|]^2$ $I1_Y = (|WF1 + GF_Y(i-1)|)^2$ $WW1 = \overline{[WF0 + GF_X \cdot (i-1)]} \cdot (WF1 + GF_Y(i-1))$ $I2_X = (|WF0 - 2 \cdot GF_X|)^2$ $I2_Y = (|WF1 - 2 \cdot GF_Y|)^2$ $WW2 = \overline{(WF0 - 2 \cdot GF_X)} \cdot (WF1 - 2 \cdot GF_Y) \quad \text{Equation Set 4}$ For each transmitter beamlet and each sensor array aperture, 4 complex unknowns ($GF_X$, $GF_Y$, $WF0_X$ and $WF0_Y$) with six real equations ($I0_X$, $I0_Y$, $I1_X$, $I1_Y$, $I2_X$, and $I2_Y$) and three complex equations (WW0, WW1, and WW2) result from the polarimetric data. This provides a total of 8 unknowns and 12 real constraints. In addition, any solution of these four quantities could be multiplied by an arbitrary phase and still be a solution, so the absolute phase of the solution is unobservable, thereby reducing the number of unknowns which can be solved to 7. Fortunately, the control process only requires the relative phase of these quantities, so for convenience any global phase condition may be added, such as requiring $WF0_X$ to be real. Other phase conditions can also be used (such as requiring $WF0_Y$ to be real or pure imaginary) without changing the final control solution.

There are many standard methods to solve these overdetermined set of equations, known to those skilled in the art, including least-squares regression. One technique is presented in Equation Set 5.

$$WF0 = \sqrt{I0_X}$$

$$WF1 := \sqrt{I0_Y} \cdot \frac{WW0}{|WW0|}$$

$$IX = \min\left[\frac{(I0_X - 2 \cdot I1_X + I2_X)}{4 \cdot \sqrt{I0_X}}, \frac{\sqrt{I2_X}}{2}\right]$$

$$GF1_X = \left(I0_X - \sqrt{I2_X - 4 \cdot IX^2}\right) + i \cdot IX$$

$$GF2_X = I0_X + \sqrt{I2_X - 4 \cdot IX^2} + i \cdot IX$$

$$IY = \min\left(\frac{I0_Y - 2 \cdot I1_Y + I2_Y}{4 \cdot \sqrt{I0_Y}}, \frac{\sqrt{I2_Y}}{2}\right)$$

$$GF1_Y = \left[\left(I0_Y - \sqrt{I2_Y - 4 \cdot IY^2}\right) + i \cdot IY\right] \cdot \frac{WW0}{|WW0|}$$

$$GF2_Y = \left(I0_Y + \sqrt{I2_Y - 4 \cdot IY^2} + i \cdot IY\right) \cdot \frac{WW0}{|WW0|}$$

Equation Set 5

Note that in Equation Set 5, there are two solutions each for $GF_X$ labeled $GF1_X$ and $GF2_X$. Using simply the $I0_X$, $I1_X$ and $I2_X$ data, a quadratic equation in the real part of $GF_X$ is obtained which has two possible solutions. A similar ambiguity occurs in the $GF_Y$ solution. The first solution, i.e., the solution in the standard quadratic formula with the minus sign in front of the square root, has been found to be almost always the "correct" one because of a simple physical reason: Since $I0_X$ is positive, a plus sign means a Green's Function magnitude greater than $I0_X$ which is the sum of 100 or more Green's Functions. This can happen occasionally when the complex sum of the many Green's Functions is by chance close to zero, but that is rare. Thus, the minus sign is almost always the correct one. This can be used all the time with only a slight degradation in beam control performance. The same is true for $GF_Y$.

Also note that the solution listed above does not use the WW1 or WW2 data. By using both possible solutions each for $GF_X$ and $GF_Y$, four different estimates of WW1 and WW2 can be formulated. The ones which match best in a least-squares sense can be chosen as the "correct" ones. This algorithm can do somewhat better than simply using the minus sign solution as discussed above.

Next is the calculating step 520 for determining the phase modulation value for the beamlets of the transmitter array. The key component of this step 520 is the definition of a suitable beam quality metric that uses the measured Green's Functions. A suitable beam quality metric is often a metric correlated to a high quality hit spot on the target. Such a beam quality metric is also often a function of the phase modulation values applied to the transmitter beamlets. Those values that maximize a suitably defined metric will produce a high quality hit spot on the target provided that the metric is maximized by a high quality hit spot.

One principle that can be used to define a suitable beam quality metric is that the smoothness of the wavefront of light scattered from the hit spot on the target back to the sensor array is greatest when the hit spot is the smallest (which is also often the best quality beam). The graininess of the intensity pattern observed at the sensor array (often called the speckle size in the art) is approximately given by the equation below:

$$d_{speckle} = \lambda R / d_{hitspot}$$

where $\lambda$=wavelength of the HEL beam, R=range to the target and $d_{hitspot}$=rms diameter of the hit spot intensity.

Thus, the mean size of the intensity speckles observed at the sensor will be maximized by the smallest possible hit spot which is also the best quality hit spot from a beam control perspective. A useful limiting case is a single point source on the target ($d_{hitspot}$=0) which creates a uniform expanding spherical wave ($d_{speckle}$=∞)—which may be considered the ultimately smooth pattern on the sensor array.

When the turbulence level is not too severe, excellent beam control can be achieved using the very simple metric labeled "Metric" in Equation Set 6 where only a single polarization is used. This simplifies the design of the sensor array since optical elements of each aperture can simply contain a polarizer and a detector.

$$WF_X(\phi_{bmlet}, \overrightarrow{x_{sensor}}) = \sum_{jt=1}^{N_{bmlet}} \left(e^{i\phi_{bmlet\,jt}} \cdot GF_X(jt, \overrightarrow{x_{sensor}})\right)$$

$$WS_X(\phi_{bmlet}, \overrightarrow{x_{sensor}}) = \text{Smoothed}\left[(|W_X(\phi_{bmlet}, \overrightarrow{x_{sensor}})|)^2\right]$$

$$\text{Metric}(\phi_{bmlet}) = \sum_{\overrightarrow{x_{sensor}}} (|WS_X(\phi_{bmlet}, \overrightarrow{x_{sensor}})|)^2$$

Equation Set 6 where the Smoothed operator is defined as convolution with a circle, square, or Gaussian kernel.

Once the Green's Functions have been found for one polarization, the wavefront for any combination of transmitter beamlet phase modulation values $\phi_{bmlet}$ may be computed. Then, the square of the complex field can be used to get the intensity of the pattern and smooth it by averaging over areas or convolving with a circle, square or Gaussian kernel. The exact size of the smoothing area is often not critical. Adequate performance can be achieved when the size is approximately half the diameter of the transmitter array.

The metric in Equation Set 6 contains fourth order terms. It can be maximized in many ways. One technique is to calculate one beamlet phase at a time by assuming that the metric is very nearly sinusoidal for each beamlet phase. While this is not exactly true (since the metric is fourth order in the phasors), it turns out to be a reasonable approximation in most cases and leads to very fast convergence to a solution. The metric can be evaluated at three phase offsets such as 0, π/2 and π, fit to a sine wave and then the phase φ chosen where the sinusoidal function is its maxima. Equation Set 7 shows one approximate technique to maximize the metric function.

$$D0 = \text{Metric}(0)$$

$$D1 = \text{Metric}\left(\frac{\pi}{2}\right)$$

Equation Set 7

-continued $$D2 = \text{Metric}(\pi)$$

$$\phi = \arg[(D0 - D2) + i \cdot (2 \cdot D1 - D0 - D2)]$$

where arg(a) is defined to be phase in radians of the complex quantity a.

Each transmitter array beamlet phase value can be calculated sequentially and the process is repeated several times. Often this process rapidly converges as the phase modulation values per each transmitter array beamlet approach their optimal values for the given set of equations.

When the turbulence becomes more severe, where even a point source at the target will show intensity fluctuations called scintillation, the simple metric shown above may be insufficient. A more suitable metric which retains a high level of performance even under severe turbulence conditions uses the cross product between the wavefronts of the two polarizations. This metric is more robust under strong turbulence because the phase difference between the two polarizations is reasonably well preserved since both polarizations are passing through the same turbulence along the path from the target to the sensor array. This phenomenon causes the turbulence have similar effects on both polarizations and cancels out in the difference between their phases.

A process of computing a more robust metric is given in Equation Set 8.

$$\begin{pmatrix} WF_X(\phi_{bmlet}, \overrightarrow{x_{sensor}}) \\ WF_Y(\phi_{bmlet}, \overrightarrow{x_{sensor}}) \end{pmatrix} = \begin{bmatrix} \sum_{jt=1}^{N_{bmlet}} \left( e^{i\phi_{bmlet\,jt}} \cdot GF_X(jt, \overrightarrow{x_{sensor}}) \right) \\ \sum_{jt=1}^{N_{bmlet}} \left( e^{i\phi_{bmlet\,jt}} \cdot GF_Y(jt, \overrightarrow{x_{sensor}}) \right) \end{bmatrix}$$

$$W_{XY}(\phi_{bmlet}, \overrightarrow{x_{sensor}}) = \overline{WF_X(\phi_{bmlet}, \overrightarrow{x_{sensor}})} \cdot WF_Y(\phi_{bmlet}, \overrightarrow{x_{sensor}})$$

$$WS_{XY}(\phi_{bmlet}, \overrightarrow{x_{sensor}}) = \text{Smoothed}(W_{XY}(\phi_{bmlet}, \overrightarrow{x_{sensor}}))$$

$$\text{Metric}(\phi_{bmlet}) = \sum_{\overrightarrow{x_{sensor}}} (|WS_{XY}(\phi_{bmlet}, \overrightarrow{x_{sensor}})|)^2$$

Equation Set 8

After solving for both the X and Y Green's functions, one can then calculate the complex conjugate cross-products for any set of transmitter beamlet phase modulation values associated with the complex phasors $\phi_{bmlet}$. As discussed above this complex conjugate product should cancel out most of the turbulence induced phase changes between the target and the sensor. The product is first smoothed as discussed earlier, and then squared and summed over the sensor array to result in the final metric which is then used in a similar way to the way the simpler metric is used to find a hit spot solution. This metric has been shown to work well even under deep turbulence conditions where the scintillation of the wavefronts has saturated.

The next step 530 is to generate an image of the hit spot on the target. This step 530 can be used to determine the location of incidence on the target for the composite beam so that the phase solution obtained can be re-directed to another aimpoint. Here the Green's Functions give the ability to reconstruct a coherent image of the target registered to the hit spot solution using the technique in Equation Set 9. The transmitter beamlet phasing solution $\phi_{bmlet}$ is first used to construct the wavefronts $WF_X$ and $WF_Y$ which would have come from the high quality hit spot. Then, the complex conjugates of these wavefronts are multiplied by the transmitter Green's Functions one by one. Each of these products is then Fourier transformed and squared to result in a single heavily speckled coherent image. The sum of all these images for all beamlets and both polarizations helps average out the speckled nature of coherent images to yield a higher quality image of the target.

$$\begin{pmatrix} WF_X(\overrightarrow{x_{sensor}}) \\ WF_Y(\overrightarrow{x_{sensor}}) \end{pmatrix} = \begin{bmatrix} \sum_{jt=1}^{N_{bmlet}} \left( e^{i\phi_{bmlet\,jt}} \cdot GF_X(jt, \overrightarrow{x_{sensor}}) \right) \\ \sum_{jt=1}^{N_{bmlet}} \left( e^{i\phi_{bmlet\,jt}} \cdot GF_Y(jt, \overrightarrow{x_{sensor}}) \right) \end{bmatrix}$$

Equation Set 9

$$\text{Img} = \sum_{jt=1}^{N_{bmlet}} (|fft(\overline{WF_X} \cdot GF_X(jt, \overrightarrow{x_{sensor}}))|)^2 + \sum_{jt=1}^{N_{bmlet}} (|fft(\overline{WF_Y} \cdot GF_Y(jt, \overrightarrow{x_{sensor}}))|)^2$$

The principle behind the above set of imaging equations is fairly simple. As is well known in the art, a lens functions equivalent to Fourier transforming and squaring the field at the aperture. Thus the field at the aperture can be considered the Fourier transform of the coherent image of the wavefront reflecting off the target. In the case of $WF_X$ and $WF_Y$ they are both coming from a small hit spot typically close to diffraction limited in size. In the case of a Green's Function, the target region is broadly floodlit to show details such as burn spots, wings and shape. Thus $WF_X$ and $WF_Y$ can be considered the Fourier transform of the hit spot while each of the Green's Functions can be considered the Fourier transform of the floodlit target image.

As is well known in Fourier transform theory, when two Fourier transforms of two images are multiplied and then inversely transformed, the convolution of the original two images result—in this case the convolution of the hit spot with the floodlit target. The resulting image contains a floodlit target with the hit spot location.

Next is the steering step 540 for guiding the hit spot to a desired location on the target. This step 540 may become necessary because often the phasing solution produces a hit spot at a location other than the desired location. For most conditions where the turbulence is not extreme, this repositioning of the hit spot may be carried out simply by adding a tilt to the calculated phase modulation values which then moves the spot to the desired location. However, in the case of deep turbulence, the phase solution can change significantly from one location to the other. In that case, alternate sets of phase solutions may be generated and the one closest to the desired location can be used.

One technique to generate multiple phasing solutions is to maximize the metric while constraining the second solution to be orthogonal to the first one. Then, the third solution is constrained to be orthogonal to both the first and the second solutions. Subsequent steps are continued in this fashion, constraining the next solution to be orthogonal to the solutions already computed.

Once a suitable hit spot is selected, the corresponding set of phase modulation values are applied to the beamlets. In selecting a suitable hit spot location, one would usually include the requirement to compensate for the speed of light relative to the target and point slightly ahead of a moving target. In systems which track a moving target, the desired offset can be calculated by using information provided by the tracking system.

Thus, a control system for a multi-beam laser is disclosed. The system can be used to focus a high quality beam upon a remote target. A method for measuring the phase distortions encountered by each of the beamlets of the laser en route to the target and back to a sensor array, and a method for determining the phase of each of the beamlets so that a tightly focused composite beam is incident on a desired location on the target have also been disclosed.

While embodiments of these inventions have been shown and described, it will be apparent to those skilled in the art that many more modifications are possible without departing from the inventive concepts herein. The inventions, therefore, are not to be restricted except in the spirit of the following claims.

What is claimed is:

1. A multi-beam laser control system comprising:
   a laser transmitter configured to emit light in a plurality of beamlets toward a remote target, wherein each beamlet is coherent with all other beamlets and adjustable in phase and steering independent of all other beamlets;
   a plurality of first sensors, each first sensor optically coupled to one of the plurality of beamlets and configured to measure a direction of light backscattered off the target relative to the coupled beamlet;
   a second sensor configured to receive light from the beamlets backscattered off the target through a plurality of sensor apertures and to measure an intensity of received light in each sensor aperture;
   a processor communicably coupled to the first sensors and to the second sensor and configured to compute a phase correction and a steering correction for each beamlet; and
   a controller communicably coupled to the processor and to the laser transmitter and configured to adjust a phase and steering of each beamlet.

2. The system of claim 1 wherein the second sensor comprises a plurality of sub-sensor and receiving aperture pairs.

3. The system of claim 1 wherein the laser transmitter comprises a master oscillator power amplifier (MOPA).

4. The system of claim 1 wherein the laser transmitter comprises a fiber laser tree configured to split an optical signal from a master oscillator one or more times and to amplify each split signal.

5. The system of claim 1 wherein the laser transmitter is configured to emit light at a predetermined wavelength, and the second sensor is configured to measure intensity and phase differences for two independent polarizations.

6. The system of claim 1 wherein the laser transmitter is configured to emit light at a predetermined wavelength and to switch between two polarizations, and the second sensor is configured to measure intensity and phase differences for two independent polarizations.

7. The system of claim 1 wherein the laser transmitter is configured to emit light at a predetermined wavelength and to switch between two polarizations, and the second sensor is configured to measure an intensity of both polarizations.

8. The system of claim 1 wherein the laser transmitter is configured to emit light at a predetermined wavelength and at two polarizations, and the second sensor is configured to measure an intensity of both polarizations.

9. The system acclaim wherein the controller is configured to increment the phase of each beamlet by at least two offsets from an initial value and to then restore the phase to the initial value.

10. The system of claim 9 wherein the second sensor is configured to capture an image of the received light at two or more offsets of each beamlet phase.

11. The system of claim 10 wherein the processor is configured to compute a relative phase of the wavefront of each beamlet based on the images captured by the second sensor.

12. The system of claim 1 wherein the processor is configured to compute the phase correction on the basis of maximizing a beam quality of a composite beam incident upon the target, wherein the composite beam is a sum of all beamlets emitted from the transmitter.

13. The system of claim 1 wherein the processor is configured to compute the phase correction on the basis of minimizing a hit spot size of a composite beam on the target, wherein the composite beam is a sum of all beamlets emitted from the transmitter.

14. The system of claim 1 wherein the processor is configured to compute the phase correction on the basis of maximizing a mean size of intensity speckles received at the second sensor.

15. The system of claim 1 wherein the phase correction is computed using only a sub-region or a subset of the data received at the second sensor.

16. The system of claim 1 wherein the laser transmitter comprises a steering mechanism configured to steer at least one of the beamlets.

17. The system of claim 16 wherein the processor is configured to compute a steering direction and to control the steering mechanism according to the steering direction.

18. The system of claim 17 wherein the processor is configured to compute the steering direction such that an optical axis of an emitted beamlet coincides with a centroid of light from the beamlets scattered off the target and incident upon an aperture of the emitted beamlet.

19. The system of claim 16 wherein the steering mechanism comprises liquid crystal gratings.

20. The system of claim 16 wherein the steering mechanism comprises a Risky prism pair.

21. The system of claim 2 wherein at least one of the receiving apertures is configured to steer light incident upon the respective receiving aperture.

22. The system of claim 21 wherein the respective receiving aperture is further configured to steer incident light such that an optical axis of the respective receiving aperture coincides with a centroid of light from the beamlets scattered off the target and incident on the respective receiving aperture.

23. A method of controlling a multi-beam laser, the method comprising:
   emitting light in a plurality of coherent beamlets from a laser transmitter toward a remote target each beamlet being independently steerable;
   receiving light from the beamlets backscattered off the target;
   measuring a direction of the light backscattered of the target relative to each beamlet;
   measuring an intensity of the beamlets backscattered off the remote target;
   adjusting a direction of at least one of the emitted beamlets based upon the measured direction of the backscattered light; and
   adjusting a phase of at least one of the emitted beamlets based upon the measured intensity of the backscattered light.

24. The method of claim 23 further comprising pre-adjusting the phase of at least one of the beamlets by a fixed value prior to receiving light from the beamlets backscattered off the target.

25. The method of claim 24 wherein pre-adjusting the phase of at least one of the beamlets includes pre-adjusting the phase of a plurality of the beamlets, one beamlet at a time.

26. The method of claim 24 wherein pre-adjusting the phase of the beamlet includes changing a phase value of the beamlet twice and then restoring the phase value to a starting phase value.

27. The method of claim 26 wherein changing the phase value includes incrementing the phase value by $\pi/2$.

28. The method of claim 25 wherein measuring the intensity includes measuring the intensity after pre-adjusting the phase of each beamlet.

29. The method of claim 28 further comprising calculating phase distortions induced by a transmission medium disposed between the laser transmitter and the remote target based upon the intensity or the direction of light measured after pre-adjusting, the phase of at least one of the beamlets.

30. The method of claim 29 further comprising calculating a phase correction for at least one beamlet based on the phase distortions induced by the transmission medium.

31. A method of controlling a multi-beam laser, the method comprising:
   directing a plurality of coherent beamlets emitted from the multi-beam laser toward a remote target, each beamlet being independently steerable;
   manipulating a phase at least one of the beamlets;
   measuring a direction of laser light return relative to each beamlet, the laser light return including scatter from the beamlets incident upon the target;
   calculating for at least one beamlet a phase distortion induced by a transmission medium disposed between the multi-beam laser and the target based on the detected direction of laser light return;
   calculating a phase correction value of at least one beamlet based on the calculated phase distortion; and
   adjusting the phase of at least one beamlet based on the calculated phase correction value.

32. The method of claim 31 wherein manipulating the phase includes incrementing a phase value of the beamlet twice and then restoring a starting phase value.

33. The method of claim 31 wherein calculating the phase correction value includes maximizing beam quality for a subset of beamlets incident upon the target.

34. The method of claim 31 wherein calculating the phase correction value includes minimizing a hit spot area formed by a subset of beamlets incident on the target.

35. The method of claim 31 wherein calculating the phase correction value includes maximizing a mean size of intensity speckles in the detected laser light return.

36. The method of claim 31 wherein calculating the phase correction value includes calculating the phase correction value using a sub-region of the detected laser light return.

37. The method of claim 31, further comprising calculating a steering direction error of at least one of the beamlets.

38. The method of claim 37, further comprising adjusting the steering direction of the beamlet based on the calculated steering direction error.

39. The method of claim 37 wherein calculating the steering direction error includes aligning a main optical axis of the emitted beamlet to coincide with a centroid of the laser light return.

40. The system of claim 1, wherein the processor is further configured to generate an image of the remote target from the beamlets backscattered off the target.

* * * * *